Patented Nov. 21, 1933

1,936,497

UNITED STATES PATENT OFFICE 1,936,497

METHOD OF MANUFACTURING FERMENTATION GLYCEROL

Wallace H. Carothers, Fairville, Pa., Julian W. Hill and Frank J. L. Van Natta, Wilmington, Del., assignors to E. I. du Pont de Nemours & Company, Wilmington, Del., a corporation of Delaware No Drawing. Application October 11, 1930, Serial No. 488,188. Renewed May 4, 1933

23 Claims. (Cl. 87—4)

This invention relates to a process of manufacturing glycerol having a high degree of purity and more particularly to the production of highly purified glycercol of dynamite grade from glycerol obtained by the fermentation of sugar.

Among the various methods suggested for the distillation of glycerol from the slop resulting from the fermentation of sugar in an alkaline medium, the method outlined in the Patent 1,627,040 issued May 3, 1927 to J. W. Lawrie, has proven to be especially successful. The glycerol obtained from the fermentation process, however, contains certain impurities which are not removed by the mentioned patented process, nor by any other process of which we are aware. While some of the steps disclosed herein have been used heretofore in the manufacture of glycerol it is new insofar as we are aware to manufacture purified glycerol in accordance with the combination of steps which forms the subject matter of the present invention.

This invention has as an object an improved process of manufacturing purified glycerol of dynamite grade. A further object is the manufacture of such glycerol from the impure glycerol obtained by the distillation of the slop resulting from the fermentation of sugar. A further object is the manufacture of highly purified glycerol from the spray tower distillate resulting from the process disclosed in the previously mentioned patent. A further object is a process of manufacturing purified glycercol from glycerol containing appreciable amounts of polyhydric phenols and basic substances as impurities. Other objects will appear hereinafter.

These objects are accomplished by the following invention which comprises the fermentation of sugar in an alkaline medium the distillation of the glycerol from the dealcoholized and concentrated fermentation products and the subjection of the glycerol so produced to a series of purifying steps which are effected under special conditions and in certain sequence as will more fully appear.

We have found that the impurities which render fermentation glycerol, as above referred to, unsafe for the manufacture of dynamite, and which cannot be readily removed by distillation, consist largely of polyhydric phenols, including hydroquinone, methyl hydroquinone, and di-methyl hydroquinone. In addition to the phenols, acid substances, such as caproic acid, may be found. Basic substances and inert or neutral substances are also present. These impurities, unlike the tar and glycol impurities, cannot readily be separated by distillation. Roughly, the polyhydric phenols may constitute about 58% of the impurities not readily separated by distillation with topping, the basic substances 20%, neutral substances 20% and acids 2%. While our improved process produces glycerol by fermentation in alkaline medium substantially free from all these impurities, the steps we have developed for the removal of the phenols and the basic substances may be considered as the more fundamental steps because the removal of the acids and neutral substances does not present so difficult a problem, the removal of these substances being effected in the course of the steps involved in the distillation for the removal of the phenols and nitrogenous substances. We have, in the present process, developed a chemical treatment to be applied to the crude glycerol, such that all those impurities which cannot subsequently be readily removed by a suitable distillation and carbon treatment, are destroyed.

The method of conducting our process for manufacturing the highly purified glycerol may be illustrated by reference to the following steps:

(1) Fermentation:
The first step in our improved process consists in fermenting sugar, usually molasses, in the presence of alkalies or salts in the manner known to the art.

(2) Distillation of the fermentation glycerol:
The glycerol is then distilled from the concentrated and dealcoholized slop resulting from the fermentation process. The distillation is preferably effected by contacting the finely divided or atomized slop with steam, the distillation being most desirably conducted by the method of the Lawrie patent referred to, in which the atomized slop is passed counter-current to superheated steam in vacuum.

(3) Addition of lime and blowing with air:
The distillate containing appreciable amounts of polyhydric, and especially dihydric phenols, is made alkaline with lime and blown with air for several hours until the phenols are destroyed. This procedure destroys the polyhydric phenols with the formation of volatile quinones and substances of complex constitution, presumably of the humic acid type, which are removed in the subsequent filtration and distillation steps. The reducing value as determined by a Fehling's solution determination is reduced in this operation to a small fraction of the initial value.

(4) Boiling to hydrolyze the introgen compounds:
The liquor is boiled to hydrolyze the nitrogen compounds and eliminate them as volatiles, the end point of this step being indicated by the cessation of the evolution of the volatile nitrogen bases, i. e., ammonia and amines.

(5) Filtration:

After cooling, the solution is filtered. The precipitate is very dark in color and consists of unchanged lime and impurities.

The following steps 6, 7 and 8 are for the purpose of eliminating the lime in solution from the liquor. This consists essentially in neutralizing the solution to cause precipitation of an insoluble calcium salt which is removed by filtration. As indicated in the following steps 6 and 7, it is preferred to convert the lime to calcium carbonate by carbon dioxide and then boil to insure complete conversion of the bicarbonate formed to the insoluble carbonate.

(6) Neutralization with carbon dioxide:

After the filtration, the solution is neutralized or made faintly acid to litmus by passing in carbon dioxide.

(7) Boiling for a short time:

After the treatment with carbon dioxide, the solution is heated to boiling for a short time to convert any calcium bicarbonate formed in step number 6 to insoluble calcium carbonate.

(8) Filtration:

After cooling, the solution is filtered. The precipitate consists largely of calcium carbonate.

(9) Concentration in vacuum:

The liquid after filtration is next concentrated at 100° C., preferably under reduced pressure which may vary from atmospheric to about 100 mm., to a glycerol content of 80% or more. While it is possible to conduct the concentration at atmospheric pressure it is desirable to operate at lower pressures, preferably about 40 mm. At this stage the liquor is a dark brown syrup.

(10) Distillation:

The distillation is preferably effected under vacuum with steam. To this end the concentrated liquor obtained from the preceding step is distilled with steam in a vacuum with suitable arrangements for topping off materials of lower boiling point than glycerol. This distillation of the concentrated glycerol is preferably carried out with superheated steam under low pressure (100 mm. or less at pump). The separation of the glycerol from compounds of lower boiling point is accomplished by maintaining the receiver at a suitable temperature to effect condensation of the glycerol but not of the lower boiling constituents of the vapor which, after passage through a column to prevent carrying over of the glycerol, are condensed in another receiver maintained at a lower temperature but sufficiently high to prevent the condensation of the water which passes over and is condensed. The product collected in the first receiver is glycerol of dynamite glycerol strength, light yellow to light brown in color, and of no odor, or very mild, inoffensive odor. It sometimes has a slight fluorescence.

(11) Deodorizing and decolorizing with carbon:

The dynamite glycerol produced in the preceding distillation step may be further purified by decolorizing and deodorizing with a small amount of decolorizing charcoal (about 2% based on the glycerol) of the type known to those skilled in the art to be suitable for the purpose. This procedure is carried out by agitating the glycerol with the finely divided carbon at somewhat elevated temperatures (50–200° C.) and then filtering. The filtration must be carried out in such a manner as to remove the carbon from the glycerol completely. This may be accomplished by the addition of a silicious filtering agent, or some such material before filtration. The final product of the treatment ranges in color from colorless to light straw, is substantially odorless, and gives no reaction with Fehling's solution.

The preferred mode of carrying out our invention may be exemplified by the following specific example:

The dealcoholized and concentrated slop obobtained by fermenting molasses in alkaline medium is preheated at least to its boiling point at atmospheric pressure (about 105°–110° C.) and under a pressure of about 30–40 pounds gauge is delivered to the top of the still where it is atomized. The still is maintained under a vacuum of about 27.5 to 28 inches of mercury and the glycerol is distilled from the atomized slop by a current of steam, at 140 lbs. gauge pressure and superheated to about 350° C., which enters at the bottom of the still and passes upwardly counter-current to the falling atomized slop. The gaseous mixture of glycerol and steam then passes to condensers by means of which the glycerol is separated.

Forty grams of freshly slacked lime is then added to four liters of this approximately 20% impure aqueous glycerol solution (spray tower distillate) and air is blown through the mixture for four hours. The mixture is next boiled for three hours, allowed to cool, and filtered. Carbon dioxide is passed into the mixture until it is faintly acid to litmus. The faintly acid mixture is heated to boiling for 15 minutes and filtered after cooling. The brown solution is next concentrated at 100° C. to 80% or more glycerol content in the vacuum of a water aspirator. The dark brown syrup thus obtained is then distilled with superheated steam at a pressure of 20 mm. (at the vacuum pump) using two receivers in series each equipped with a bead filled column. The distilling glycerol is maintained at 180° C., the first receiver at 125° C., and the second receiver at 65° C. The water passing over is condensed by means of cold water. The glycerol collecting in the first receiver is then treated at 100° C. with 2% of its weight of decolorizing carbon and a small amount of filtering agent and filtered. The resulting glycerol is very light in color and practically odorless.

While the fermentation in alkaline medium and the details of the distillation of the glycerol from the products of fermentation, form no part of the present invention per se, nevertheless these steps, broadly expressed, are an integral part of our improved process for producing highly purified glycerol inasmuch as the remaining steps set forth are peculiarly related to the production of glycerol by fermentation and subsequent distillation because, insofar as we are aware, no glycerol other than that obtained by fermentation contains the specific impurities which the remaining steps of our process are designed to remove. More specifically, an integral part of our process is the separation of the glycerol from the other fermentation products by distilling the concentrated and dealcoholized slop in atomized form with superheated steam under vacuum, because we have found that this method of distillation is the only one which successfully yields the specific type of impure glycerol above referred to, with sufficiently high operating economy to bring about the maximum success and economy in our improved process of manufacturing the purified glycerol which is the object of this invention. Our invention in its broader aspect may, however, be considered as a process of purifying glycerol containing appreciable amounts of polyhydric alcohols, and/or complex nitrogenous materials. With reference to the specific purifying steps, step 3, blowing the alkaline glycerol liquor alkaline with lime, is essential for the destruction of the phenols. Step 4, the boiling after the blowing treatment, is necessary for the elimination of the nitrogen bases. It may be noted that simultaneous blowing and boiling does not yield a satisfactory product. It is highly desirable to include step 5, the separation of unchanged lime, because it effects an economy in the neutralizing agent in step 6 by removing most of the excess lime.

It was also found that if this step is eliminated, violent frothing occurs during distillation which makes distillation difficult, if not impossible, at least on a small scale. In order to obtain a satisfactory yield, the steps involved in the elimination of the calcium base from the solution, are essential. With respect to this elimination of the lime from the solution, the neutralization of step 6 may be effected with another acid, as sulfuric, thereby eliminating the boiling mentioned in step 7. Sulfuric acid, however, is less desirable as a neutralizing agent because the removal of the base as the sulfate is less complete than as the carbonate.

It is to be understood, for the purposes of this invention, that the reference to lime in the claims is merely a convenient method of designating the alkaline agent, and that this term in the claims is intended to refer more specifically to calcium hydroxide and more generally to the class of alkaline agents found to be the most desirable, i. e., the alkaline earth bases which form readily removable insoluble salts with the acidic substance used in the sixth step previously mentioned.

Alkaline agents, such as sodium hydroxide, which are difficult to remove and the salts of which cause trouble in the distillation, are not desirable.

It is also to be understood that the filtering steps mentioned in the claims are intended to comprehend any feasible method of separating the solid material from the liquor.

In the distillation operation described above the removal of lower boiling materials is accomplished in one step by the arrangement and control of the distilling apparatus. The same result may be attained by subjecting the concentrated glycerol to a straight superheated steam vacuum distillation and subsequently distilling off the lower boiling materials (up to 135° C.) in an ordinary distillation equipment in a good vacuum, such as 3 mm. to 100 mm., using a fractionating column. The residue in the still is then treated with carbon in the way described.

It has heretofore been difficult to obtain satisfactory dynamite glycerol from fermentation processes. The processes previously used usually produce glycerol having a higher percentage of impurities than is desired in glycerol of dynamite grade. The process of the present invention, on the other hand, yields dynamite glycerol of good color and odor and containing but traces of impurities.

As many apparently widely different embodiments of this invention may be made without departing from the spirit and scope thereof, it is to be understood that we do not limit ourselves to the specific embodiments thereof except as defined in the appended claims.

We claim:

1. In a process of manufacturing glycerol the steps which comprise fermenting sugar in an alkaline medium, distilling the glycerol from the other fermentation products, rendering the distilled glycerol alkaline with lime, and blowing the liquid with air to destroy the phenols.

2. In a process of manufacturing glycerol the steps which comprise fermenting sugar in an alkaline medium, distilling the glycerol from the other fermentation products, rendering the distilled glycerol alkaline with lime, blowing the liquor with air to destroy the phenols, filtering, and eliminating the lime in solution from the liquor.

3. The process of manufacturing glycerol which comprises fermenting sugar in an alkaline medium, distilling the glycerol from the other fermentation products, rendering the distilled glycerol liquor alkaline with lime, blowing the liquor with air to destroy the phenols, boiling the liquor to hydrolyze the nitrogen compounds, and eliminating the lime in solution from the liquor.

4. The process of manufacturing glycerol which comprises fermenting sugar in an alkaline medium, distilling the glycerol from the other fermentation products, rendering the distilled glycerol liquor alkaline with lime, blowing the liquor with air to destroy the phenols, boiling the liquor to hydrolyze the nitrogen compounds, filtering, and eliminating the lime in solution from the liquor.

5. The process of manufacturing glycerol which comprises fermenting sugar in an alkaline medium, distilling the concentrated and dealcoholized slop in atomized form with superheated steam under vacuum, rendering the distilled glycerol liquor alkaline with lime, blowing the liquor with air to destroy the phenols, boiling the liquor to hydrolyze the nitrogen compounds, filtering, and eliminating the lime in solution from the liquor.

6. The process of manufacturing glycerol which comprises fermenting sugar in an alkaline medium, distilling the glycerol from the other fermentation products, rendering the distilled liquor alkaline with lime, blowing the liquor with air until the phenols are destroyed, boiling the liquor until the volatile nitrogen bases are no longer evolved, filtering, precipitating the lime from the liquor, and filtering off the precipitate.

7. The process of manufacturing glycerol which comprises fermenting sugar in an alkaline medium, distilling the glycerol from the other fermentation products, rendering the distilled liquor alkaline with lime, blowing the liquor with air until the phenols are destroyed, boiling the liquor until the volatile nitrogen bases are no longer evolved, filtering, precipitating the lime from the liquor, filtering off the precipitate, and distilling the glycerol from the liquor with superheated steam in a vacuum.

8. The process of manufacturing glycerol which comprises fermenting sugar in an alkaline medium, distilling the glycerol from the other fermentation products, rendering the distilled liquor alkaline with lime, blowing the liquor with air until the phenols are destroyed, boiling the liquor until the volatile nitrogen bases are no longer evolved, filtering, precipitating the lime from the liquor, filtering off the precipitate, distilling the glycerol from the liquor with superheated steam in a vacuum, and heating the distilled glycerol with decolorizing carbon.

9. The process of manufacturing glycerol which comprises fermenting sugar in an alkaline medium, distilling the glycerol from the other fermentation products, rendering the distilled liquor alkaline with lime, blowing the liquor with air until the phenols are destroyed, boiling the liquor until the volatile nitrogen bases are no longer evolved, filtering, precipitating the lime from the liquor, filtering off the precipitate, concentrating the liquor under vacuum, distilling the glycerol from the liquor with superheated steam in a vacuum and heating the distilled glycerol with decolorizing carbon.

10. The process of manufacturing glycerol which comprises fermenting sugar in an alkaline medium, distilling the glycerol from the other fermentation products, rendering the distilled liquor alkaline with lime, blowing the liquor with air until the phenols are destroyed, boiling the liquor until the volatile nitrogen bases are no longer evolved, filtering, neutralizing the liquor with carbon dioxide, boiling the liquor to cause substantially complete precipitation of the lime as carbonate, and filtering off the precipitate.

11. The process of manufacturing glycerol which comprises fermenting sugar in an alkaline medium, distilling the glycerol from the other fermentation products, rendering the distilled liquor alkaline with lime, blowing the liquor with air until the phenols are destroyed, boiling the liquor until the volatile nitrogen bases are no longer evolved, filtering, neutralizing the liquor with carbon dioxide, boiling the liquor to cause substantially complete precipitation of the lime as carbonate, separating the precipitate from the liquor and distilling the glycerol from the liquor with superheated steam in a vacuum.

12. The process of manufacturing glycerol which comprises fermenting sugar in an alkaline medium, distilling the glycerol from the other fermentation products, rendering the distilled liquor alkaline with lime, blowing the liquor with air until the phenols are destroyed, boiling the liquor until the volatile nitrogen bases are no longer evolved, filtering, neutralizing the liquor with carbon dioxide, boiling the liquor to cause substantially complete precipitation of the lime as carbonate, separating the precipitate from the liquor distilling the glycerol from the liquor with superheated steam in a vacuum, and heating the distilled glycerol with decolorizing carbon.

13. The process of manufacturing glycerol which comprises fermenting sugar in an alkaline medium, distilling the glycerol from the other fermentation products, rendering the distilled liquor alkaline with lime, blowing the liquor with air until the phenols are destroyed, boiling the liquor until the volatile nitrogen bases are no longer evolved, filtering, neutralizing the liquor with carbon dioxide, boiling the liquor to cause substantially complete precipitation of the lime as carbonate, separating the precipitate from the liquor concentrating the liquor under vacuum, distilling the glycerol from the liquor with superheated steam in a vacuum, and heating the distilled glycerol with decolorizing carbon.

14. A process of manufacturing glycerol which comprises fermenting sugar in an alkaline medium, distilling the glycerol from the other fermentation products, rendering the distilled glycerol liquor alkaline with lime, blowing the liquor with air until the phenols are destroyed, boiling the liquor until the volatile nitrogen bases are no longer evolved, filtering, neutralizing the alkaline liquor, filtering, concentrating the liquor at about 100° C. under a pressure of about 40 mm. or less to a minimum glycerol content of about 80%, distilling the concentrate with superheated steam in a vacuum, separating the glycerol from the steam and lower boiling materials by fractionation, agitating the glycerol with finely divided carbon at a temperature within the approximate range of 50–200° C., and filtering the glycerol from the carbon.

15. A process of manufacturing purified glycerol from glycerol containing appreciable amounts of polyhydric phenols which comprises rendering the impure glycerol alkaline with lime, and blowing with air to destroy the phenols.

16. A process of manufacturing purified glycerol from glycerol containing appreciable amounts of polyhydric phenols which comprises rendering the impure glycerol alkaline with lime, blowing with air to destroy the phenols, and eliminating the lime in solution from the liquor.

17. A process of manufacturing purified glycerol from glycerol containing appreciable amounts of polyhydric phenols which comprises rendering the impure glycerol alkaline with lime, blowing with air to destroy the phenols, filtering, and eliminating the lime in solution from the liquor.

18. A process of manufacturing purified glycerol from glycerol containing appreciable amounts of polyhydric phenols and nitrogen compounds, which comprises rendering the impure glycerol alkaline with lime, blowing with air to destroy the phenols, boiling to hydrolyze the nitrogen compounds, and eliminating the lime in solution.

19. A process of manufacturing purified glycerol from glycerol containing appreciable amounts of polyhydric phenols and nitrogenous materials which comprises rendering the impure glycerol liquor alkaline with lime, blowing the liquor with air until the phenols are destroyed, boiling the liquor to hydrolize the nitrogen compounds, filtering, and eliminating the lime in solution from the liquor.

20. A process of manufacturing highly purified glycerol from glycerol containing appreciable amounts of polyhydric phenols and nitrogenous materials which comprises rendering the impure glycerol liquor alkaline with lime, blowing the liquor with air until the phenols are destroyed, boiling the liquor until the volatile nitrogen bases are no longer evolved, filtering, precipitating the lime from the liquor, and filtering off the precipitate.

21. A process of manufacturing highly purified glycerol from glycerol containing appreciable amounts of polyhydric phenols and nitrogenous materials which comprises rendering the impure glycerol liquor alkaline with lime, blowing the liquor with air until the phenols are destroyed, boiling the liquor until the volatile nitrogen bases are no longer evolved, filtering, precipitating the lime from the liquor, filtering off the precipitate, distilling the glycerol from the liquor with superheated steam in a vacuum, and heating the distilled glycerol with decolorizing carbon.

22. A process of manufacturing highly purified glycerol from glycerol containing appreciable amounts of polyhydric phenols and nitrogenous materials which comprises rendering the impure glycerol liquor alkaline with lime, blowing the liquor with air until the phenols are destroyed, boiling the liquor until the nitrogen bases are no longer evolved, filtering, neutralizing the liquor with carbon dioxide, boiling the liquor to cause substantially compete precipitation of the lime as carbonate, and filtering off the precipitate.

23. A process of manufacturing highly purified glycerol from glycerol containing appreciable amounts of polyhydric phenols and nitrogenous materials which comprises rendering the impure glycerol liquor alkaline with lime, blowing the liquor with air until the phenols are destroyed, boiling the liquor until the volatile nitrogen bases are no longer evolved, filtering, neutralizing the liquor with carbon dioxide, boiling the liquor to cause substantially complete precipitation of the lime as carbonate, separating the precipitate from the liquor concentrating the liquor under vacuum, distilling the glycerol from the liquor with superheated steam in a vacuum and heating the distilled glycerol with decolorizing carbon.

WALLACE H. CAROTHERS.
JULIAN W. HILL.
FRANK J. E. VAN NATTA.